(12) United States Patent
O'Neill et al.

(10) Patent No.: US 12,195,199 B2
(45) Date of Patent: Jan. 14, 2025

(54) SELF-LEVELING SUPPORT APPARATUS

(71) Applicants: James O'Neill, Canton, MA (US); Jonathan Fleming, Blacksburg, VA (US)

(72) Inventors: James O'Neill, Canton, MA (US); Jonathan Fleming, Blacksburg, VA (US)

( * ) Notice: Subject to any disclaimer, the term of this patent is extended or adjusted under 35 U.S.C. 154(b) by 0 days.

(21) Appl. No.: 17/389,769

(22) Filed: Jul. 30, 2021

(65) Prior Publication Data
US 2022/0033103 A1 Feb. 3, 2022

Related U.S. Application Data

(60) Provisional application No. 63/059,570, filed on Jul. 31, 2020.

(51) Int. Cl.
*B64U 60/50* (2023.01)
*B64F 1/12* (2006.01)
*B64U 10/20* (2023.01)

(52) U.S. Cl.
CPC ............. *B64F 1/12* (2013.01); *B64U 60/50* (2023.01); *B64U 10/20* (2023.01)

(58) Field of Classification Search
CPC ............ B64F 1/12; B64U 60/50; B64U 10/20
See application file for complete search history.

(56) References Cited

U.S. PATENT DOCUMENTS

| | | | |
|---|---|---|---|
| 2,165,617 A | 7/1939 | De Oliveira et al. | |
| 2,268,017 A | 12/1941 | Busick et al. | |
| 2,278,081 A | 3/1942 | Harold | |
| 2,365,387 A | 12/1944 | Briscoe | |
| 2,510,285 A | 6/1950 | Heyerman | |
| 2,908,472 A * | 10/1959 | Mcdonald | F15B 11/16 180/9.5 |
| 4,062,507 A * | 12/1977 | Felder | B64C 25/00 244/104 FP |
| 4,519,559 A | 5/1985 | Logan et al. | |
| 9,033,276 B1 * | 5/2015 | Calvert | B64C 25/10 244/102 R |
| 9,550,567 B1 | 1/2017 | Erdozain et al. | |
| 9,592,908 B2 | 3/2017 | Gentry | |
| 10,336,441 B2 * | 7/2019 | Kim | B64D 45/04 |
| 11,420,732 B2 * | 8/2022 | Atsumi | B64C 1/22 |
| 2007/0221783 A1 * | 9/2007 | Parks | G06Q 30/08 244/102 A |

(Continued)

OTHER PUBLICATIONS

Claudio V. Di Leo, Design of a Crashworthy Cable-Driven Four-Bar Link Robotic Landing Gear System, Journal of Aircraft, Mar.-Apr. 2020, vol. 57, No. 2.

*Primary Examiner* — Tye William Abell
(74) *Attorney, Agent, or Firm* — Timothy D. Bennett; Emerson Thomson Bennett

(57) ABSTRACT

Provided is a self-leveling support apparatus for use with a UAV or stationary device such as a table or ladder, the apparatus having multiple leg members, each associated with a hydraulic or pneumatic cylinder; a connection among the hydraulic or pneumatic cylinders such that they share a common reservoir of fluid; a locking mechanism that obstructs free flow of fluid among the cylinders and stabilizes the UAV or stationary device without the need for electronic sensors or control systems.

10 Claims, 5 Drawing Sheets

(56) References Cited

U.S. PATENT DOCUMENTS

| | | | |
|---|---|---|---|
| 2008/0078616 A1* | 4/2008 | Ursitti | E06C 7/44 |
| | | | 182/201 |
| 2014/0249702 A1* | 9/2014 | Pflug | B64C 25/52 |
| | | | 701/16 |
| 2018/0141644 A1* | 5/2018 | Waltner | B64C 25/60 |
| 2020/0207464 A1* | 7/2020 | Whitlock | B64C 25/22 |

* cited by examiner

SELF-LEVELING SUPPORT APPARATUS

CROSS-REFERENCE TO RELATED APPLICATION

This application claims the benefit of U.S. Provisional Application No. 63/059,570, filed Jul. 31, 2020, the entirety of which is fully incorporated by reference herein.

TECHNICAL FIELD

The present invention relates to a passive self-leveling support apparatus and various embodiments. More particularly, the present invention relates to landing gear for unmanned aerial vehicles with additional application for tables, ladders, or other devices that could benefit from a simple self-leveling mechanism.

BACKGROUND

Unmanned aerial vehicles ("UAVs") comprise any aerial vehicle that is either piloted remotely or controlled by means of an onboard control system without human intervention. UAVs may be used to perform military, scientific, photographic, or other functions without direct risk to human life or where alternative means for performing that function would be impracticable. For example, the U.S. military has used UAVs to carry out aerial attacks on foreign targets. Also, photographers use UAVs with onboard cameras to obtain safely and inexpensively photographs with unique angles or perspectives.

UAVs, like manned aerial vehicles, typically take one of two forms: fixed wing or rotary wing. Fixed wing UAVs resemble airplanes in appearance and flight pattern, whereas rotary wing UAVs resemble helicopters in that they employ vertical take-off and landing ("VTOL") techniques rather than horizontal take-off and landing like fixed wing aerial vehicles.

A need arises for VTOL UAVs to be able to land on sloped or uneven ground while maintaining the body of the aircraft at a level orientation. When a manned helicopter lands, the pilot must evaluate the landing area to determine whether it is level enough to land the aircraft safely. If the area is too sloped or uneven, the pilot may choose to land the aircraft at a different location. Landing a helicopter on an uneven surface may create instability during landing and take-off and, in more extreme cases, cause the helicopter blades to contact objects on the ground or the ground itself or may cause the aircraft to tip over onto its side. A VTOL UAV often faces the same risks as a helicopter when landing on a sloped or uneven surface, but without a pilot on board, or a visual feedback system to assist a remote pilot, to inspect the surface and make adjustments or choose another location, the risks faced by the UAV are greater than those of a manned aircraft. Specifically, the landing areas available to a VTOL UAV may be more limited, and therefore its utility may likewise be significantly limited. If a VTOL UAV tips over during landing or comes to rest at an angled position, it may not be able to perform its intended function or to resume flight without operator intervention, often at significant cost or delay.

This leveling problem for VTOL UAVs has been addressed using active systems. Active leveling systems may use sensors to detect tilt or unevenness in the landing environment and an electronic control system to adjust the length or orientation of landing supports by motorized means. These active systems depend on the accuracy and reliability of the vehicle's electrical system and whether the sensors and motors operate optimally in the lighting, weather, and other conditions present. Active systems also require a power source that can add weight and cost.

Therefore, a passive system that does not require powered electronics or motors can present a more efficient solution. The need for leveling also arises where stationary devices, such as restaurant tables and work ladders, must maintain level orientation for proper operation. Restaurant tables frequently become unstable and tilt when loaded or pressed upon. This instability occurs because the four (or more) feet of the table do not all rest on the floor with equal fit, either because the floor is not flat or the feet are not positioned properly. Similarly, work ladders must be maintained in a true vertical orientation when in use in order to minimize the risk of toppling. Because ladders often are used on unlevel ground, it is useful to employ some means of leveling the ladder to maintain safe operation.

SUMMARY OF THE INVENTION

The present invention provides a support and landing apparatus that allows VTOL UAVs to land, and devices like restaurant tables and work ladders to rest in a level orientation, on sloped or uneven surfaces without the use of additional sensors, motors, or controls. The basic apparatus comprises multiple leg members that extend and retract independently in a longitudinal or rotational fashion and incorporating a closed pneumatic or hydraulic fluid assembly comprising one cylinder associated with each leg member. The fluid assembly is configured such that each leg displaces its own cylinder and all cylinders are connected together into one system through a manifold. As one leg contacts the landing surface during descent, the shortening leg displaces the fluid within the cylinder of that leg and resultantly elongates one or more of the other legs. The descent ceases when all legs come into contact with the ground and the pneumatic system is fully compressed, providing support to the vehicle.

This invention also provides a means to level a table, ladder, or other structure without the use of additional sensors, motors, or controls. The apparatus functions the same when the table or ladder is lowered into position as the landing apparatus functions when the UAV descends. One leg contacts the ground first and begins to shorten and displace the fluid cylinder until the remaining legs have come into contact with the ground and the fluid system is compressed, providing stability in a level orientation.

Specifically, one embodiment of this invention comprises a self-leveling support device for use with an associated unit, the self-leveling support device comprising two or more hydraulic cylinders each having a piston rod extending in a downward angle and a housing the upper end of which is attached to the unit being supported wherein the cylinders are connected by one or more hydraulic lines configured to allow the cylinders to share a single reservoir of hydraulic fluid such that compression of one cylinder resulting from contact between the piston rod and a surface produces elongation of other cylinders.

According to another embodiment of this invention, the lower end of each piston rod is hingedly attached to a point along the midsection of a leg member which is itself hingedly attached at its upper end to the unit being supported and supports the unit at rest.

According to another embodiment of this invention, one or more locking valves are disposed in the hydraulic lines connecting the cylinders such that activation of the locking valve or valves prevents flow of fluid among the cylinders. According to another embodiment of this invention, these locking valves each comprise a piston that accesses the hydraulic fluid such that the piston is displaced, and the locking valve activated, by an increase above a threshold value in pressure of the hydraulic fluid in the cylinders and lines. According to another embodiment of this invention, these locking valves are activated by means of an electronic control system.

According to yet another embodiment of this invention, these locking valves are activated by means of a solenoid electrically connected to a pressure sensor disposed to detect pressure of the hydraulic fluid.

According to another embodiment of this invention, the hydraulic fluid is replaced by pneumatic or other fluid.

According to another embodiment of this invention, the self-leveling support device is used as a landing gear apparatus for an associated UAV and comprises two or more pneumatic cylinders each having a piston rod extending only downward and a housing the upper end of which is attached to the unit being supported wherein the cylinders are connected by one or more pneumatic lines configured to allow the cylinders to share a single volume of gas such that compression of one cylinder produces elongation of others.

BRIEF DESCRIPTION OF THE DRAWINGS

The invention, a self-leveling support device (the "invention"), may take physical form in certain parts and arrangement of parts, embodiments of which will be described in detail in this specification and illustrated in the accompanying drawings which form a part hereof and wherein.

DETAILED DESCRIPTION

Figure 1:
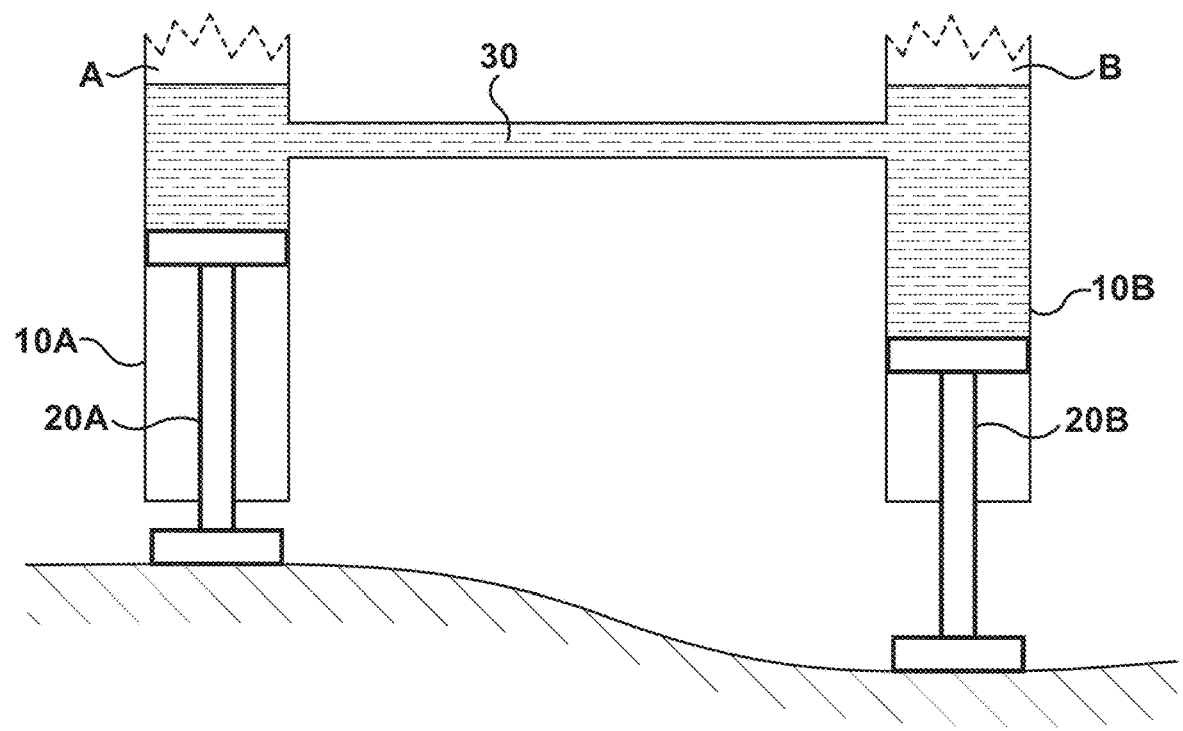
FIG. 1 is a cut-away schematic diagram showing a simplified version of the invention.

Referring now to the drawings wherein the showings are for purposes of illustrating embodiments of the self-leveling support device (the "invention") only and not for purposes of limiting the same, and wherein like reference numerals are understood to refer to like components.

With reference to FIG. 1, leg A and leg B of the unit being supported (i.e., the UAV, table, ladder, etc., ("unit")) are each fitted with a cylinder comprising a housing 10A/10B, a piston rod 20A/20B. A line 30 that comprises either a flexible tube or rigid channel connects the cylinders. A fluid is disposed within the reservoir formed by line 30 and cavities bounded by the cylinder housings 10A/10B and the upper ends of piston rods 20A/20B. The fluid fully occupies the reservoir within the line 30 and the cylinder cavities and is allowed to flow freely through the line 30 and within the cylinders such that compression of piston rod 20A produces an elongation of piston rod 20B and vice versa. The fluid is denoted in the diagram by the dotted and dashed hatched area. The fluid in the invention can be air or any other fluid such as hydraulic fluid.

When piston rod 20A contacts an independent surface, such as a landing area, as the unit is lowered, the piston rod 20A displaces the fluid contained in housing 10A. As a result, the fluid travels through the line 30 and produces elongation of the other piston rod 20B until it likewise contacts the surface. When both piston rod 20A and piston rod 20B come into contact with the surface, the fluid has nowhere else to go and the unit comes to rest in the level orientation at which it was lowered.

In one embodiment, a foot member (not shown) is attached to the lower end of each piston rod 20A/20B.

In another embodiment, the lower end of each piston rod 20A/20B attaches to a point along the midsection of a leg (not shown) whose upper end is hingedly secured to the unit being supported and whose lower end contacts the landing surface (not shown).

Figure 2:
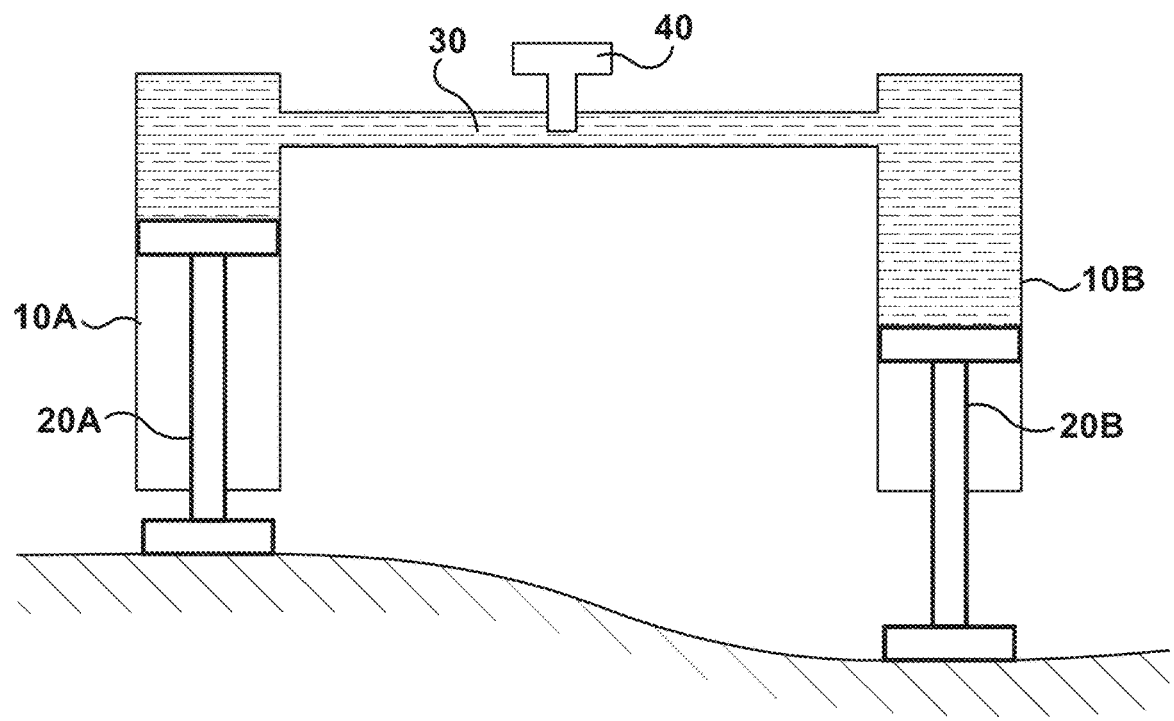
FIG. 2 is a schematic diagram showing a simplified version of an embodiment of the invention that includes a locking feature.

With reference to FIG. 2, line 30 that connects housings 10A/10B can include one or more locking valves 40 that, when activated, interrupts the flow of fluid between the cylinders. When activated, this locking valve prevents the further displacement of any fluid, which holds the piston rods 20A/20B in a stationary position and allows the unit to be fixed in a stable orientation. When the locking valve is deactivated, it opens and allows the fluid to move freely between cylinders and within line 30.

Figure 3A:
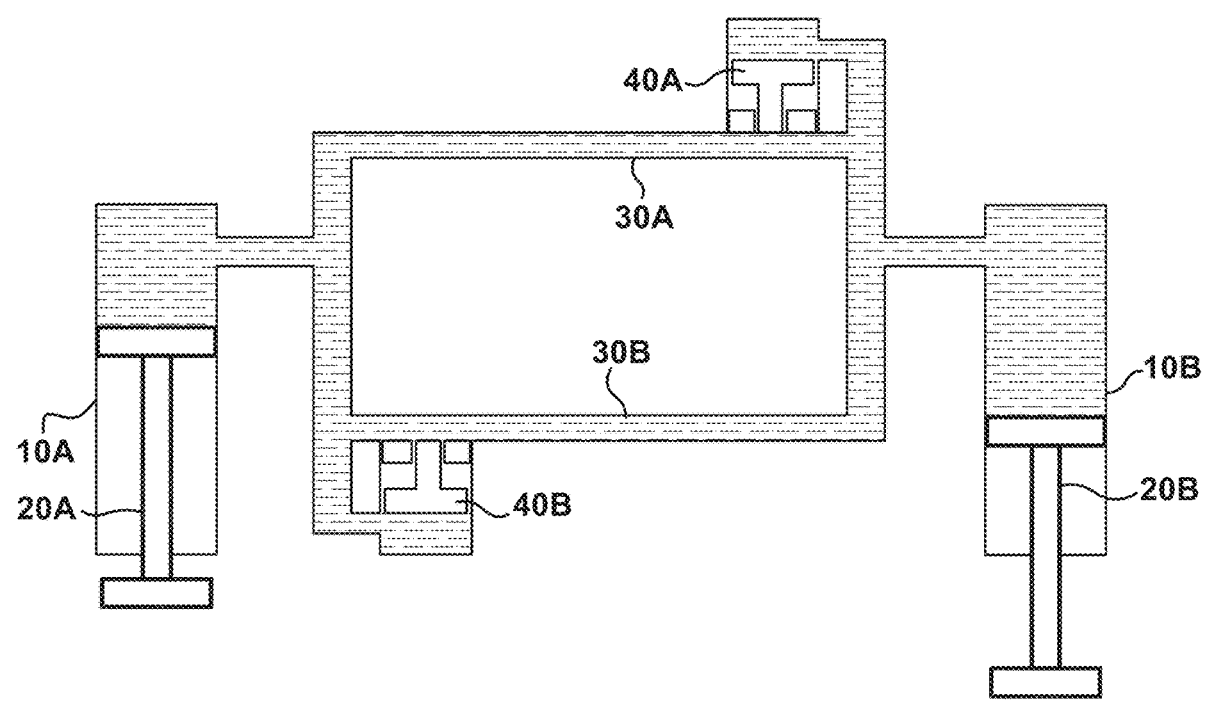
FIGS. 3A and 3B show embodiments of the invention that include an automatic passive locking system.
Figure 3B:
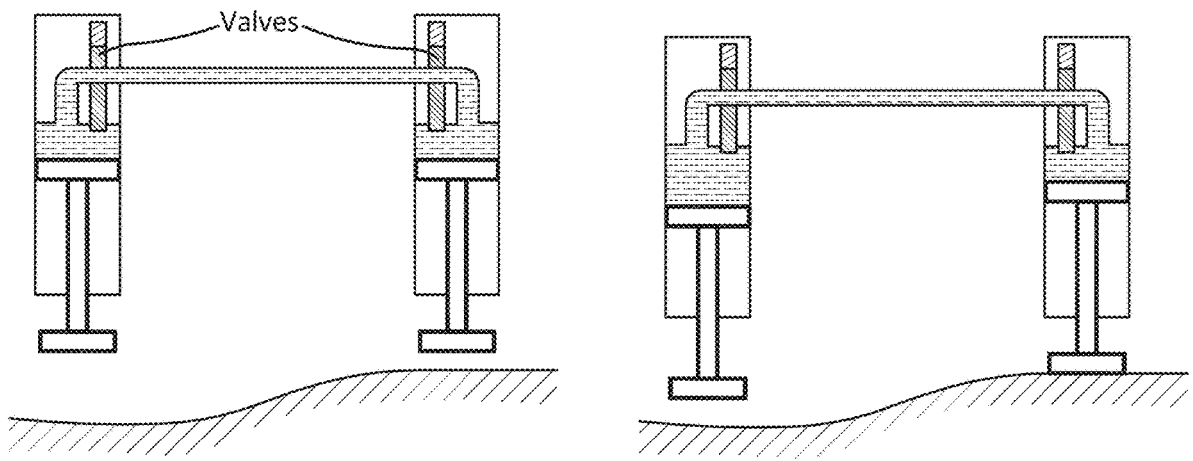
Figure 3B:
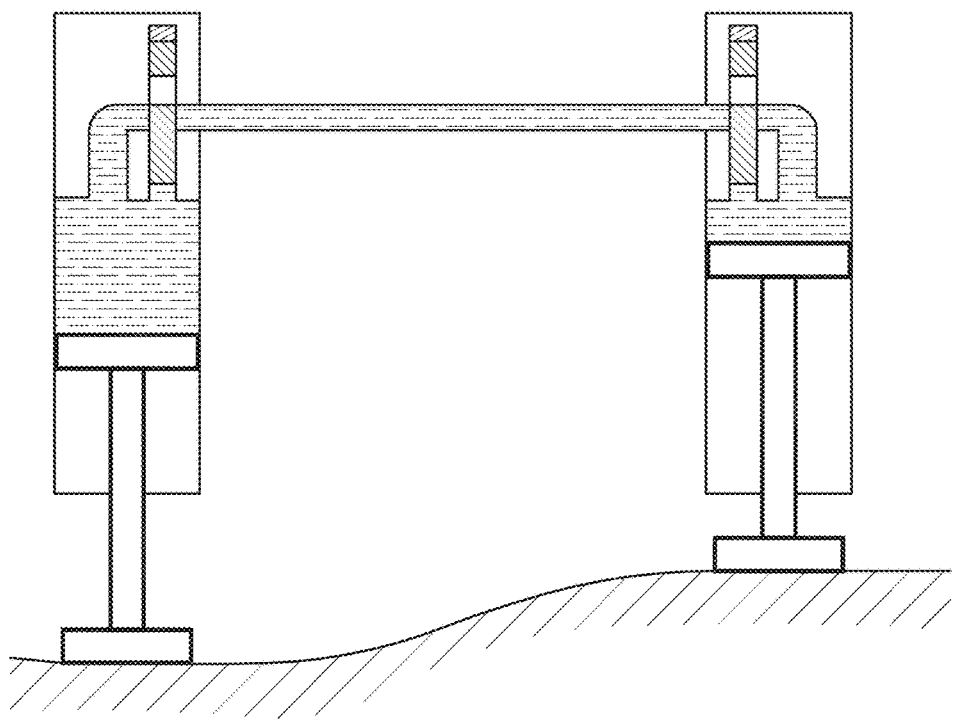

With reference to FIG. 3, the line that connects cylinders 10 can be split into two channels 30A/30B. Each channel 30A/30B can include a locking valve 40A/40B that is activated when the pressure of hydraulic fluid increases above a threshold pressure. When both piston rods 20A/20B are in contact with the ground or other surface, the fluid pressure in the system increases, closing both valves 40A/40B and interrupting the flow of fluid between the housings 10A/10B. This locking feature allows the unit to be fixed in a stable orientation automatically when resting its full weight on the ground or when an additional downward force is applied.

According to one embodiment, the locking valves 40A/40B may be activated by means of an electronic control system (not shown).

According to another embodiment, the locking valves 40A/40B may be activated by means of solenoid (not shown) electrically connected to a pressure sensor (not shown) disposed within the system to detect pressure of the hydraulic fluid.

According to another embodiment, each hydraulic cylinder is replaced with a pneumatic cylinder according to the specific application.

Figure 4:
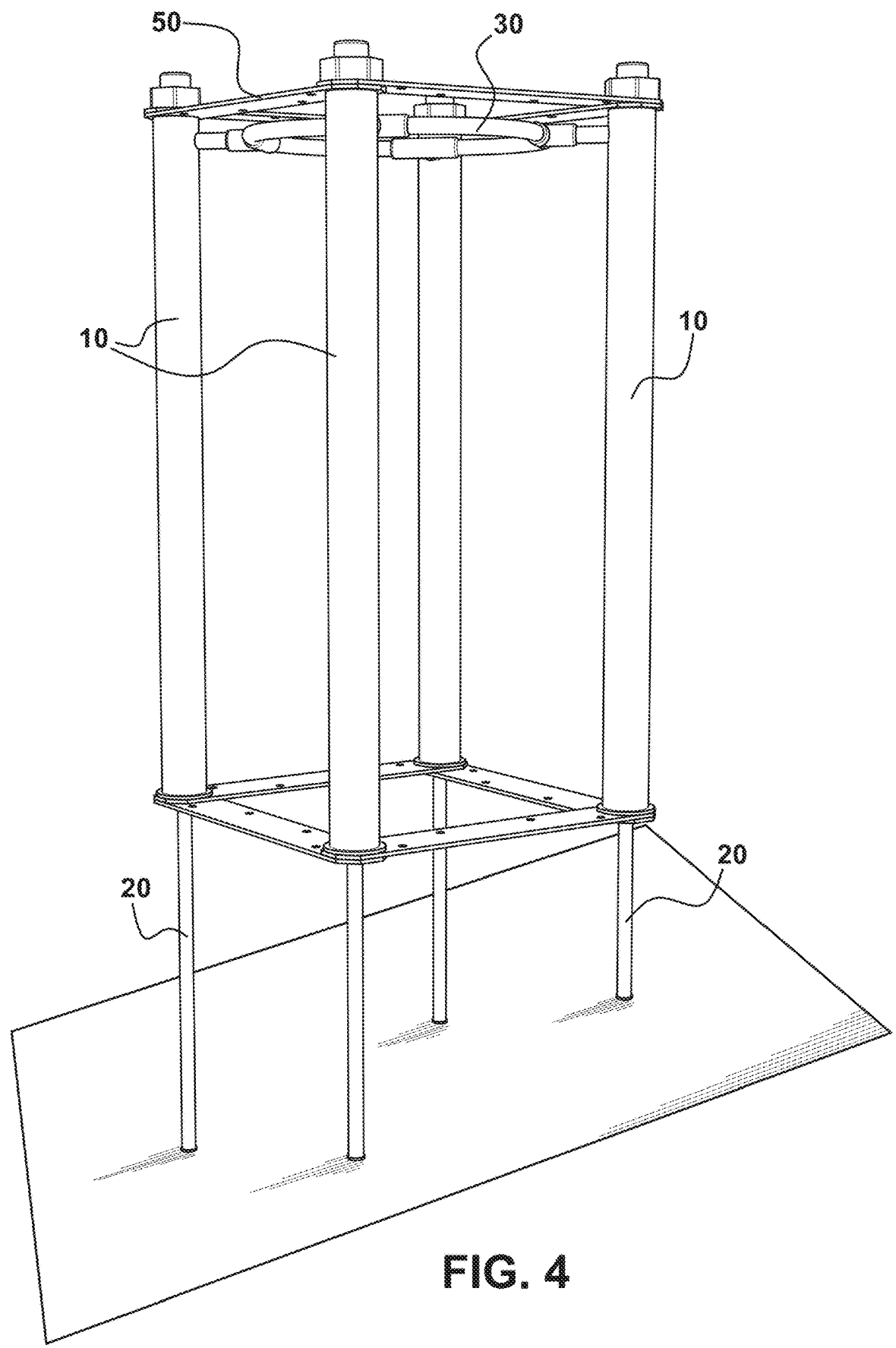
FIG. 4 shows a functional prototype of the invention reduced to practice in a configuration that includes four legs.

With reference to FIG. 4, four legs support a simplified structural unit 50 comprising structural members connected to four pneumatic cylinders, each including a housing 10 and piston rod 20. The cylinders are connected by a line 30 such that compression of one cylinder produces elongation of one or more of the others.

Figure 5:
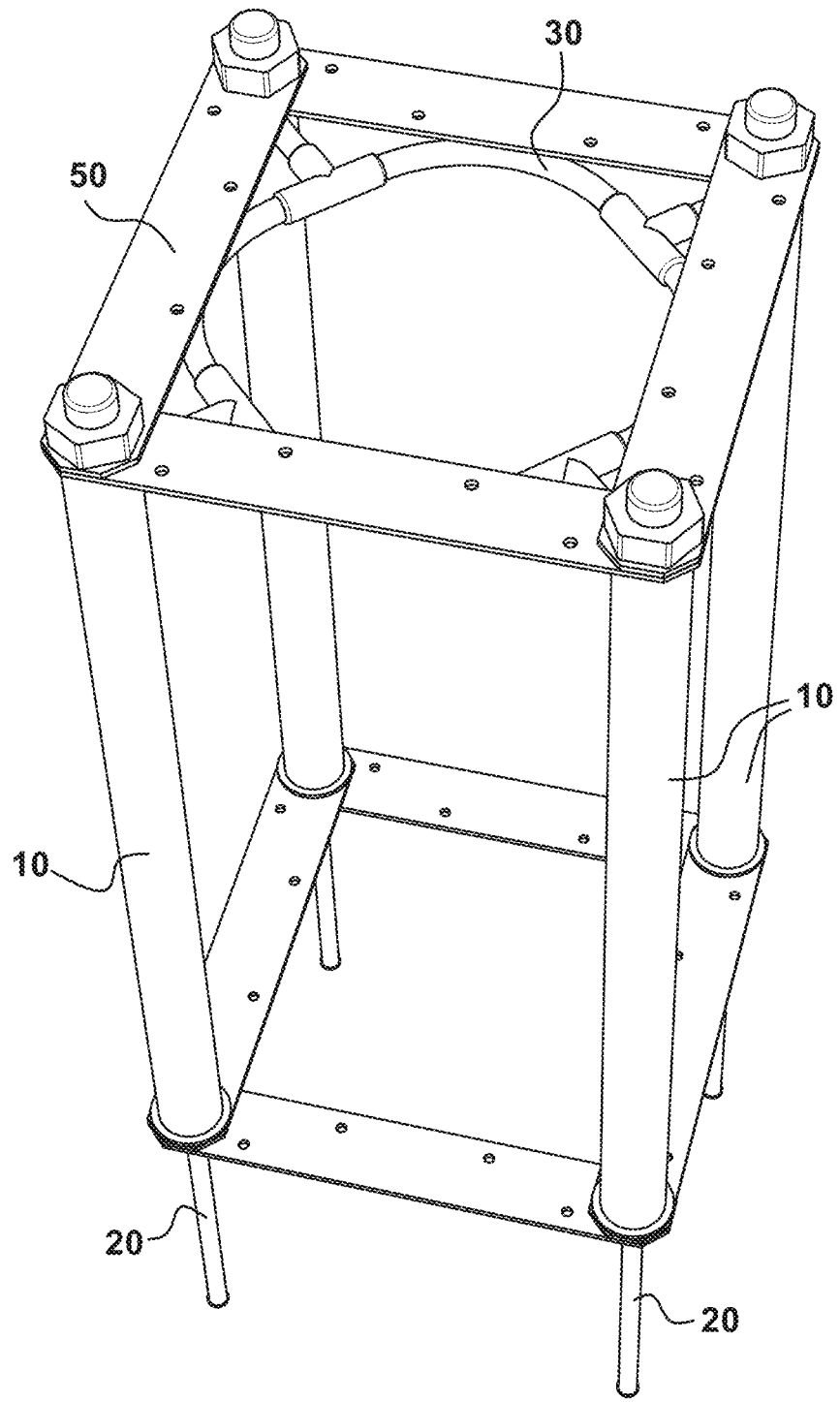
FIG. 5 shows the same functional prototype of the invention showing greater detail of the hydraulic connections.

With reference to FIG. 5, four legs support a simplified structural unit 50 comprising structural members connect to four pneumatic cylinders, each including a housing 10 and piston rod 20. The cylinders are all connected together by a line 30, allowing fluid to be shared in a common reservoir among all cylinders.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

When the word "associated" is used in the claims, the intention is that the object so labeled is not positively claimed but rather describes an object with which the claimed object may be used.

Having thus described the invention, it is now claimed:

1. A self-leveling support device for use with an associated unit, the self-leveling support device comprising:
   first and second fluid cylinders each having:
      1) a housing having an upper end selectively attachable to the associated unit;
      2) a piston positioned within the housing; and
      3) a piston rod attached to the piston and selectively extendable out from a lower end of the housing;
   a reservoir of fluid;
   a first fluid line that interconnects the first and second fluid cylinders to the reservoir of fluid;
   a first locking valve having a piston rod selectively extendable into the first fluid line;
   wherein:
      1) compression of the first fluid cylinder resulting from contact between the piston rod of the first fluid cylinder and a surface causes elongation of the second fluid cylinder;
      2) compression of the second fluid cylinder resulting from contact between the piston rod of the second fluid cylinder and a surface causes elongation of the first fluid cylinder; and
      3) activation of the first locking valve:
         (a) prevents flow of the fluid between the first and second fluid cylinders; and
         (b) occurs automatically and passively without sensors, motors or controls.

2. The self-leveling support device of claim 1 further comprising:
   a second fluid line that interconnects the first and second fluid cylinders to the reservoir of fluid; and
   a second locking valve having a piston rod selectively extendable into the second fluid line;
   wherein:
      1) the first and second fluid lines provide distinct and parallel fluid flow between the first and second fluid cylinders;
      2) activation of the first locking valve prevents flow of the fluid between the first and second fluid cylinders in the first fluid line; and
      3) activation of the second locking valve;
         (a) prevents flow of the fluid between the first and second fluid cylinders in the second fluid line; and
         (b) occurs automatically and passively without sensors, motors or controls.

3. The self-leveling support device of claim 1 further comprising:
   a second locking valve having a piston rod selectively extendable into the first fluid line;
   wherein:
      1) activation of the first locking valve prevents flow of the fluid between the first and second fluid cylinders in the first fluid line; and
      2) activation of the second locking valve;
         (a) prevents flow of the fluid between the first and second fluid cylinders in the first fluid line; and
         (b) occurs automatically and passively without sensors, motors or controls.

4. The self-leveling support device of claim 1 wherein the reservoir of fluid comprises pneumatic fluid.

5. The self-leveling support device of claim 1 wherein the reservoir of fluid comprises hydraulic fluid.

6. A self-leveling support device for use with an associated unit, the self-leveling support device comprising:
   first and second fluid cylinders each having:
      1) a housing having an upper end selectively attachable to the associated unit;
      2) a piston positioned within the housing; and
      3) a piston rod attached to the piston and selectively extendable out from a lower end of the housing;
   a reservoir of fluid that communicates exclusively with the upper ends of the housings;
   a first fluid line that interconnects the first and second fluid cylinders to the reservoir of fluid;
   a second fluid line that interconnects the first and second fluid cylinders to the reservoir of fluid;
   a first locking valve having a piston rod selectively extendable into the first fluid line; and
   a second locking valve having a piston rod selectively extendable into the second fluid line;
   wherein:
      1) the first and second fluid lines provide distinct and parallel fluid flow between the first and second fluid cylinders;
      2) compression of the first fluid cylinder resulting from contact between the piston rod of the first fluid cylinder and a surface causes elongation of the second fluid cylinder;
      3) compression of the second fluid cylinder resulting from contact between the piston rod of the second fluid cylinder and a surface causes elongation of the first fluid cylinder; and
      4) activation of the first locking valve prevents flow of the fluid between the first and second fluid cylinders in the first fluid line; and
      5) activation of the second locking valve prevents flow of the fluid between the first and second fluid cylinders in the second fluid line.

7. The self-leveling support device of claim 6 wherein the first and second locking valves are activated by an electronic control system.

8. The self-leveling support device of claim 6 wherein the first and second locking valves are activated automatically and passively without sensors, motors or controls.

9. The self-leveling support device of claim 6 wherein the reservoir of fluid comprises pneumatic fluid.

10. The self-leveling support device of claim 6 wherein the reservoir of fluid comprises hydraulic fluid.

* * * * *